United States Patent
O'Kell et al.

(10) Patent No.: US 11,952,143 B2
(45) Date of Patent: Apr. 9, 2024

(54) LIGHTING SYSTEM FOR AIRCRAFT

(71) Applicant: SAF-T-GLO LIMITED, Cwmbran (GB)

(72) Inventors: Sean Patrick O'Kell, Cwnbran (GB); Andrew Jon Hallett, Cwnbran (GB)

(73) Assignee: SAF-T-GLO LIMITED (GB)

( * ) Notice: Subject to any disclaimer, the term of this patent is extended or adjusted under 35 U.S.C. 154(b) by 0 days.

(21) Appl. No.: 18/302,595

(22) Filed: Apr. 18, 2023

(65) Prior Publication Data

US 2023/0348096 A1 Nov. 2, 2023

(30) Foreign Application Priority Data

Apr. 29, 2022 (GB) .................................. 2206271

(51) Int. Cl.
| | | |
|---|---|---|
| B64D 45/00 | (2006.01) | |
| B60Q 3/46 | (2017.01) | |
| F21K 2/00 | (2006.01) | |
| F21V 21/08 | (2006.01) | |
| G09F 13/20 | (2006.01) | |

(52) U.S. Cl.
CPC ............... *B64D 45/00* (2013.01); *F21K 2/00* (2013.01); *F21V 21/0808* (2013.01); *B60Q 3/46* (2017.02); *B64D 2045/007* (2013.01); *G09F 13/20* (2013.01)

(58) Field of Classification Search
CPC ........ B64D 45/00; F21K 2/00; F21V 21/0808
See application file for complete search history.

(56) References Cited

U.S. PATENT DOCUMENTS

| | | | | |
|---|---|---|---|---|
| 4,365,232 A | | 12/1982 | Miller | |
| 4,466,208 A | * | 8/1984 | Logan, Jr ................ | G09F 13/22 40/544 |
| 5,192,612 A | * | 3/1993 | Otter ......................... | C09J 7/38 428/343 |
| 6,467,489 B1 | * | 10/2002 | Christiansen ............. | F21K 2/00 132/73 |
| 11,273,757 B2 | * | 3/2022 | Edquist .................... | B60Q 3/47 |

(Continued)

FOREIGN PATENT DOCUMENTS

| | | |
|---|---|---|
| DE | 10 2020 121 515 | 2/2022 |
| GB | 2 602 203 | 6/2022 |

(Continued)

OTHER PUBLICATIONS

GB Search Report on GB 2206271.5 dated Oct. 27, 2022.
GB Search Report on GB 2308292.8 dated Dec. 11, 2023.
FR Search Report on FR2304186 dated Jan. 15, 2024.

*Primary Examiner* — Bryon T Gyllstrom
(74) *Attorney, Agent, or Firm* — FOLEY & LARDNER LLP

(57) ABSTRACT

An aircraft cabin lighting system comprises one or more cabin lighting units, each cabin lighting unit comprising an emergency exit sign arranged to be electrically illuminated; and one or more luminescent emergency exit signs. The luminescent emergency exit signs are portable, and each comprise an adhesive layer arranged to allow the luminescent emergency exit sign to be adhered to a surface. The signs are arranged to be adhered to a surface in the vicinity of the electrical emergency exit sign in use, and do not require electricity to function.

20 Claims, 5 Drawing Sheets

(56) References Cited

U.S. PATENT DOCUMENTS

| | | | | |
|---|---|---|---|---|
| 2004/0090787 A1* | 5/2004 | Dowling | ................ | H05B 47/18 |
| | | | | 362/479 |
| 2006/0014453 A1* | 1/2006 | Maia | ...................... | B32B 27/12 |
| | | | | 442/41 |
| 2007/0097664 A1* | 5/2007 | Stokes | .................... | G09F 13/22 |
| | | | | 362/84 |
| 2012/0233895 A1* | 9/2012 | Martin | ...................... | F21K 2/00 |
| | | | | 252/301.36 |
| 2019/0301712 A1 | 10/2019 | Bagozzi et al. | | |

FOREIGN PATENT DOCUMENTS

| | | |
|---|---|---|
| GB | 2 618 137 A | 11/2023 |
| JP | 2005-331553 A | 12/2005 |
| WO | WO-01/52224 A1 | 7/2001 |
| WO | WO-03/102465 A1 | 12/2003 |
| WO | WO-2010/092148 A1 | 8/2010 |
| WO | WO-2019/028181 A1 | 2/2019 |

\* cited by examiner

LIGHTING SYSTEM FOR AIRCRAFT

CROSS-REFERENCE TO RELATED PATENT APPLICATIONS

The present application claims priority to and the benefit of United Kingdom Patent Application No. GB 2206271.5, filed Apr. 29, 2022, the entire disclosure of which is incorporated herein by reference.

BACKGROUND

The present invention relates to emergency exit lighting systems in aircraft, and in particular to methods for handling failure of one or more electrical emergency exit signs, and to aircraft cabin lighting systems arranged to allow such a failure to be dealt with without grounding of the aircraft for a prolonged time period.

Such signs may be used to assist passengers in escaping from aircraft in an emergency situation, in particular by allowing the exits to be identified even if issues such as smoke or an electrical fault with other cabin lighting systems are interfering with visibility. The quantity and location of smoke, among other factors, may influence where people look for signs—both high-level and low-level signs may be used, optionally in addition to floor-path markings. It will be appreciated that many emergency exit signs in aircraft cabins are positioned relatively low down, near the floor of the cabin, and may therefore be described as low-level lighting systems. Such signs may be provided as part of an escape system configured to guide people towards and to identify an exit, for example combined with floor-path marking. High-level markings may be provided in addition, for example as progression signs directing viewers towards a nearest exit. Such high-level markings may need to be visible from a longer distance away than low level markings (e.g. around 12 meters or more as compared to 4-5 meters), for example with signs for each of two adjacent emergency exists being visible from a third emergency exit located between them.

In commercial passenger aircraft in particular, there are typically safety regulations and requirements. It is common to provide emergency exit signs with electrical lighting to enable them to be more readily visible. In aircraft cabins, it is a general requirement for all passenger aircraft to have lit emergency exit signs by all emergency exits. For example, Certification Specification 25 (CS 25) covers the regulations for large aircraft, noting in particular sections CS 25.811 and CS 25.812. If even one emergency exit sign fails (e.g. due to a bulb blowing, LED failing, or electrical fault), the aircraft may be in contravention of the standards and can be grounded until it is serviced, or forced to fly back to an engineering base empty/with no passengers if the airport at which the fault occurs is not an engineering base, or may be obliged to complete its intended flight with fewer passengers (for example, standards for maximum number of passengers per working emergency exit may mean that the number of passengers corresponding to one exit may not be allowed to fly if the exit light for an exit is out of order). Any of these eventualities can be very costly to an airline, and therefore would be desirably avoided. It will be appreciated that some signs have many individual lights, and some of those individual bulbs or LEDs may be allowed to fail without breaching Minimum Master Equipment List (MMEL) standards—for example, the standard may specify that at least three out of five bulbs in each sign must be working for the aircraft to be deemed flightworthy with passengers. A sign may therefore be described as "failing" when it drops below the minimum standard required (or drops to match the minimum standard, depending on safety rules regarding redundancy), whether or not one or more lights of that sign are still working.

SUMMARY

According to an exemplary embodiment, an aircraft cabin lighting system includes at least one cabin lighting unit, each cabin lighting unit comprising an electrical emergency exit sign arranged to be electrically illuminated; and at least one luminescent emergency exit sign, the luminescent emergency exit sign being portable, comprising an adhesive layer arranged to allow the luminescent emergency exit sign to be adhered to a surface, and being arranged to be adhered to a surface in the vicinity of the electrical emergency exit sign in use.

According to another exemplary embodiment, a method of providing emergency exit lighting in an aircraft cabin includes, in response to failure of an electrical emergency exit sign: obtaining a luminescent emergency exit sign from storage, the luminescent emergency exit sign comprising an adhesive layer arranged to allow the luminescent emergency exit sign to be adhered to a surface; activating the luminescent emergency exit sign; and applying the luminescent emergency exit sign to a surface in the vicinity of the failed electrical emergency exit sign such that the adhesive layer holds it in place as a replacement emergency exit sign.

According to another exemplary embodiment, a method of maintaining flight-worthiness of a passenger aircraft in instances of failure of an electrical emergency exit sign such that the aircraft can be flown back to a service point includes: obtaining a luminescent emergency exit sign from storage, the luminescent emergency exit sign comprising an adhesive layer arranged to allow the luminescent emergency exit sign to be adhered to a surface; activating the luminescent emergency exit sign; applying the luminescent emergency exit sign to a surface in the vicinity of the failed electrical emergency exit sign such that the adhesive layer holds it in place as a replacement emergency exit sign; completing an intended flight of the aircraft using the luminescent emergency exit sign as a required exit sign; and servicing the aircraft to repair or replace the failed electrical emergency exit sign in advance of a next flight of the aircraft.

BRIEF DESCRIPTION OF THE DRAWINGS

There now follows, by way of example only, a detailed description of embodiments of the present invention with reference to the accompanying drawings in which.

In the Figures, like reference numerals are used for like or corresponding features.

DETAILED DESCRIPTION

Figure 1:
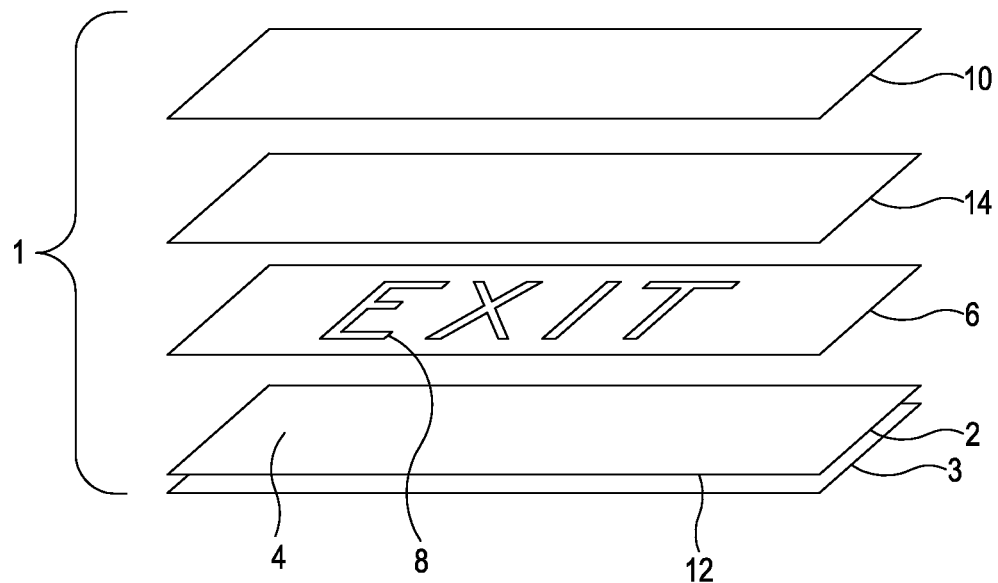
FIG. 1 is a schematic view of a photoluminescent low-level exit sign in accordance with various embodiments of the invention.

According to a first aspect, there is provided an aircraft cabin lighting system comprising one or more cabin lighting units, each cabin lighting unit comprising an emergency exit sign arranged to be electrically illuminated; and one or more luminescent emergency exit signs (which are non-electrically illuminated). The luminescent emergency exit signs are portable, and each comprise an adhesive layer arranged to allow the luminescent emergency exit sign to be adhered to a surface. The signs are arranged to be adhered to a surface in the vicinity of the electrical emergency exit sign in use.

Multiple luminescent emergency exit signs may be used simultaneously in a particular aircraft cabin, on the same flight.

As used herein, "luminescent" is defined as widely used in the field of chemistry to mean the emission of radiation (usually visible light) by chemical reactions that do not involve any significant release of heat nor electrical current. This is in contrast to light emitted from incandescent bodies, such as burning fuel, molten iron, and wire heated by an electric current. "Electroluminescence", as seen in Light-Emitting Diodes, is a result of an electric current passed through a substance, not of a chemical change, and is not included in the scope of "luminescence" as used herein. The luminescent materials as described herein do not require electricity to luminesce, by contrast to the electrically-illuminated emergency exit signs they replace.

The luminescent signs may be photoluminescent. Photoluminescent signs can be charged by exposure to light, and luminesce thereafter. As such, the photoluminescent material(s) therein are provided with energy (in the form of radiation) to enable the materials to luminesce.

The luminescent signs may be chemiluminescent. Chemiluminescent signs can be activated by deforming the sign, and luminesce thereafter. As such, the chemiluminescent signs are self-illuminating (once activated/"switched on"), and no charging is required.

In some embodiments, the luminescent signs may contain both photoluminescent and chemiluminescent material(s), and/or materials exhibiting other types of luminescence (e.g. bioluminescence).

The or each electrical emergency exit sign may be a low level exit sign, and optionally may be: (i) located adjacent to a lower corner of an emergency exit; and/or (ii) located less than 122 cm, and optionally less than 50 cm, above a floor of the aircraft cabin.

Low-level signs may identify a specific emergency exit, in particular indicating that the emergency exit is in the immediate vicinity of the sign.

In alternative or additional embodiments, the or each electrical emergency exit sign may be a high level exit sign, optionally located at least 122 cm above a floor of the aircraft cabin. The high level signs may be located adjacent to a ceiling of the aircraft cabin; optionally on a side wall or on a protrusion or fitting extending downwardly from the ceiling.

High-level signs may point towards one or more emergency exits, and may be use to direct a passenger to move towards a suitable emergency exit.

The or each luminescent emergency exit sign may be flexible such that it can adapt to the shape of a surface to which it is applied. In some embodiments with chemiluminescent signs, pressing the sign into place may be sufficient to activate the chemiluminescent material.

The or each luminescent emergency exit sign may be sized and/or shaped to cover the electrical emergency exit sign when the adhesive layer is applied thereto.

The adhesive layer may be arranged to be detachable from the surface of the electrical emergency exit sign, such that the luminescent emergency exit sign can be temporarily installed, and then removed, without damaging the sign. The adhesive layer may therefore be a removable adhesive, providing an easy-peel label.

Alternatively, the adhesive layer may be arranged to stick firmly to the surface such that the sign cannot be easily removed, and optionally cannot be removed without damaging the sign. Such embodiments may decrease a risk of tampering. Such signs may be re-useable, e.g. on application of a new adhesive layer after removal of the first, or may be one-shot and disposed of after use.

The or each luminescent emergency exit sign may comprise a luminescent layer and an exit identifier arranged to be lit by the luminescent layer. It will be appreciated that luminescence generally provides a glow, not bright illumination, but that this glow can still illuminate an exit identifier—either by causing the exit identifier to glow, or by causing a surround of the exit identifier to glow, such that the darker identifier is visible in contrast.

Various colors of luminescence may be selected. For example, a photoluminescent sign or layer may be arranged to emit blue or green light, and/or a chemiluminescent sign or layer may be arranged to emit one or more of red, green, blue, white, or infra-red light. Color may be selected based on passengers' expectations for emergency signs, with red (e.g. "EXIT" text) and green (e.g. a running person image) being common in current exit identifiers.

The exit identifier may comprise one or more words and/or symbols. The words and/or symbols may be: (i) formed by shaping of the luminescent layer; and/or (ii) formed by masking of a part of the luminescent layer.

It will be appreciated that multiple different identifiers may be provided on a single sign, and that different identifiers on the same sign may optionally be formed in different ways.

When photoluminescent material is used, the photoluminescent layer may be arranged to be chargeable with ambient cabin light.

The photoluminescent emergency exit sign may be arranged to be charged using light with a wavelength in the range from 350 nm to 500 nm.

For photoluminescent emergency exit signs, the aircraft cabin lighting system may further comprise a dedicated charging light arranged to be used to charge the photoluminescent emergency exit sign. In such embodiments, the dedicated charging light may be a spotlight—e.g. a spotlight installed on a runway or airport terminal building or other structure, and may be a permanent fixture or a moveable light—or may be a torch (US English: flashlight).

The dedicated charging light may be arranged to be used to charge the photoluminescent emergency exit sign prior to the photoluminescent emergency exit sign being adhered to the surface. The sign may therefore be held up to/near to a charging light for charging, to minimize the required charging time.

In embodiments in which the luminescent emergency exit sign is a chemiluminescent emergency exit sign, the sign may be arranged to be activated by deforming the chemiluminescent layer. For example, a user may manually "crack", bend, squeeze, and/or massage the sign to obtain luminescence. A user may be encouraged to deform the sign until an even and bright glow is provided. It will be appreciated that in this context "crack" is to be interpreted as for a glowstick—a barrier within the sign may be broken/cracked so as to allow the chemicals to mix causing a chemical reaction which provides chemiluminescence, but the sign itself is not cracked or broken. The activation of the sign may take less than 10 seconds, and optionally less than five seconds.

According to a second aspect, there is provided a method of providing emergency exit lighting in an aircraft cabin. The method comprises, in response to failure of an electrical emergency exit sign: obtaining a luminescent emergency exit sign from storage, the luminescent emergency exit sign comprising an adhesive layer arranged to allow the luminescent emergency exit sign to be adhered to a surface; charging and/or activating the luminescent emergency exit sign; and applying the luminescent emergency exit sign to a surface in the vicinity of the failed electrical emergency exit sign such that the adhesive layer holds it in place as a replacement emergency exit sign.

The luminescent emergency exit sign may be as described with respect to the first aspect.

The method may be performed using the apparatus of the first aspect.

A charging step and an activation step may both be performed, especially in embodiments with signs containing both chemiluminescent and photoluminescent materials.

In embodiments using photoluminescent materials, exposure to radiation is needed to charge the sign. The charging step may be performed during storage, after the sign is obtained but before it is applied to a surface, and/or during or after application. It will be appreciated that a charging time of at least a few minutes is generally required, so some charging time before or after application is likely to be desirable.

In some embodiments using chemiluminescent materials, the act of applying the luminescent emergency exit sign to a surface may be sufficient to activate the material, especially if the exit sign is adhered to a surface having a different shape from the shape of the chemiluminescent sign whilst in storage—pushing/pressing/bending the sign into position may provide sufficient deformation to cause the sign to glow. The activation step may therefore be performed before, during, and/or after, application to a surface.

The specific order of steps as shown in the methods is therefore not intended to be limiting.

The method may comprise, in response to the failure of an electrical emergency exit sign: obtaining a photoluminescent emergency exit sign from storage, the photoluminescent emergency exit sign comprising an adhesive layer arranged to allow the photoluminescent emergency exit sign to be adhered to a surface; charging the photoluminescent emergency exit sign by exposing it to light; and applying the photoluminescent emergency exit sign to a surface in the vicinity of the failed electrical emergency exit sign such that the adhesive layer holds it in place as a replacement emergency exit sign.

Alternatively or additionally, the method may comprise, in response to the failure of an electrical emergency exit sign: obtaining a chemiluminescent emergency exit sign from storage, the chemiluminescent emergency exit sign comprising an adhesive layer arranged to allow the chemiluminescent emergency exit sign to be adhered to a surface; activating the chemiluminescent emergency exit sign by deforming it; and applying the chemiluminescent emergency exit sign to a surface in the vicinity of the failed electrical emergency exit sign such that the adhesive layer holds it in place as a replacement emergency exit sign.

The method may further comprise removing a cover or packaging from the chemiluminescent emergency exit sign. Some chemiluminescent materials may be degraded by exposure to ultra-violet (UV) radiation, and may therefore be kept in a sealed packet (e.g. a foil wrapper) or other at least substantially opaque container prior to use, and/or a peel-off surface cover may be provided.

According to a third aspect, there is provided a method of maintaining flight-worthiness of a passenger aircraft in instances of failure of an electrical emergency exit sign such that the aircraft can be flown back to a service point. The method comprises: obtaining a luminescent emergency exit sign from storage, the luminescent emergency exit sign comprising an adhesive layer arranged to allow the luminescent emergency exit sign to be adhered to a surface; activating and/or charging the luminescent emergency exit sign; applying the luminescent emergency exit sign to a surface in the vicinity of the failed electrical emergency exit sign such that the adhesive layer holds it in place as a replacement emergency exit sign; completing an intended flight of the aircraft using the luminescent emergency exit sign as a required exit sign; and servicing the aircraft to repair or replace the failed electrical emergency exit sign in advance of a next flight of the aircraft.

The method may comprise: obtaining a photoluminescent emergency exit sign from storage, the photoluminescent emergency exit sign comprising an adhesive layer arranged to allow the photoluminescent emergency exit sign to be adhered to a surface; charging the photoluminescent emergency exit sign by exposing it to light; applying the photoluminescent emergency exit sign to a surface in the vicinity of the failed electrical emergency exit sign such that the adhesive layer holds it in place as a replacement emergency exit sign; completing an intended flight of the aircraft using the photoluminescent emergency exit sign as a required exit sign; and servicing the aircraft to repair or replace the failed electrical emergency exit sign in advance of a next flight of the aircraft.

Additionally or alternatively, the method may comprise: obtaining a chemiluminescent emergency exit sign from storage, the chemiluminescent emergency exit sign comprising an adhesive layer arranged to allow the chemiluminescent emergency exit sign to be adhered to a surface; activating the chemiluminescent emergency exit sign by deforming it; applying the chemiluminescent emergency exit sign to a surface in the vicinity of the failed electrical emergency exit sign such that the adhesive layer holds it in place as a replacement emergency exit sign; completing an intended flight of the aircraft using the chemiluminescent emergency exit sign as a required exit sign; and servicing the aircraft to repair or replace the failed electrical emergency exit sign in advance of a next flight of the aircraft.

In the method of the second or third aspect, the adhesive layer of the luminescent emergency exit sign may be applied to a surface of the failed electrical emergency exit sign. The luminescent emergency exit sign may be sized and positioned such that the electrical emergency exit sign can be completely covered. The method may therefore comprise covering the electrical emergency exit sign. This may assist in avoiding confusion due to multiple signs, and/or in decreasing visual clutter as compared to having a redundant sign also visible.

The method may further comprise detaching the luminescent emergency exit sign from the failed electrical emergency exit sign prior to servicing.

The charging the photoluminescent emergency exit sign may comprise holding the photoluminescent emergency exit sign adjacent to a light source before positioning it as a replacement emergency exit sign.

According to a fourth aspect, there is provided a temporary luminescent exit sign for use as part of an aircraft cabin lighting system when an electrically-illuminated exit sign has failed. The luminescent sign is portable and comprises an adhesive layer arranged to allow the luminescent emergency exit sign to be adhered to a surface. The sign is arranged to be adhered to a surface in the vicinity of an electrical emergency exit sign in an aircraft cabin in use. The sign comprises one or more exit identifiers. The at least one exit identifier may be or comprise a word (e.g. "EXIT") or a symbol (e.g. a running person and/or arrow). The luminescence of the sign is arranged to make the exit identifier(s) (more) visible in low-light or dark conditions.

The exit identifier(s) may be: (i) formed by shaping of the luminescent material of the sign; and/or (ii) formed by masking of a part of the luminescent material of the sign (e.g. when the luminescent material is provided in an even layer across the sign).

The sign is not electrically-powered, instead relying on luminescent processes within the sign. A non-electrical, luminescent, glow is therefore provided The sign may be photoluminescent and/or chemiluminescent.

The sign of the fourth aspect may be used as a part of the apparatus of the first aspect, and/or in the methods of the second and third aspects.

The sign may be flexible such that it can conform to a surface to which it is adhered, for example bending around corners of a fixture or fitting, or adapting to a curved wall shape.

Embodiments of the invention therefore allow for a temporary exit sign which does not need to be connected to an aircraft power source.

Current emergency egress systems often comprise a hybrid photoluminescent (PL) and electrical system, with PL floor-path marking and electrical low-level exit signs and high-level exit signs. The floor-path signs face upwards, towards cabin lights, and are generally uncovered except when people walk past, so facilitating charging of the PL material by the cabin lights in normal operation. By contrast, the low-level exit signs are generally located on a wall of the cabin, facing inwards, and low down (often below seat level). These low-level exit signs have previously been deemed unsuitable for replacement with PL signs, with their locations often being shaded in use. The present invention overcomes this prejudice in the art by introducing the concept of a portable, stick-on, photoluminescent emergency exit sign for temporary use. Further, the use of chemiluminescence in aircraft emergency aircraft systems is currently not known, at least in part because the maximum durations of sufficient glow are likely to be less than 8-12 hours, after which the sign would be "spent" and would need to be disposed of (or chemically treated at significant expense to return to the starting materials). There is therefore a prejudice in the art against the use of chemiluminescent materials for aircraft exit signs.

Embodiments of the invention therefore allow for a temporary low-level luminescent EXIT identifier sign, which may be placed with its upper edge less than 48 inches (122 cm) from the floor of the aircraft cabin.

Embodiments of the invention also allow for temporary high-level luminescent EXIT signs.

Embodiments of the invention therefore offer a luminescent (e.g. chemiluminescent and/or photoluminescent) emergency "EXIT" sign which can be kept aboard the aircraft (e.g. in a crew kit) and can be installed by a crew member without requiring any engineering expertise or training, in order to allow an aircraft to complete a flight.

Installing the luminescent sign directly over the (failed) electrical sign, such that the failed sign is covered, may provide positioning guidance to the installer as well as avoiding any confusion due to having multiple signs visible for the same exit.

The skilled person would understand that features described with respect to one aspect of the invention may be applied, mutatis mutandis, to the other aspect of the invention.

As best illustrated in FIG. 1 there is provided a luminescent emergency exit sign 1 for use as part of an aircraft cabin lighting system. The luminescent emergency exit sign 1 depicted in FIG. 1 is a photoluminescent emergency exit sign, but it will be appreciated that most features described with respect to this embodiment could be equally applied to signs exhibiting other forms of luminescence.

The photoluminescent emergency exit sign 1 of FIG. 1 comprises a plurality of layers. The sign 1 comprises a base layer 2. The base layer 2 comprises a photoluminescent material 4, and may therefore be referred to as a photoluminescent layer 2. The photoluminescent material 4 may be present evenly across the base layer 2, or only in selected regions in various embodiments. In the embodiment show, the photoluminescent material 4 is present evenly across the base layer 2.

The photoluminescent material 4 is arranged to be charged by electromagnetic wavelengths in a first range and arranged to emit electromagnetic emissions in a second range.

In the embodiment shown in FIG. 1, a marker layer 6 is provided above the photoluminescent layer 2. In the embodiment shown this is located adjacent to the base photoluminescent layer 2. The marker layer 6 has informational text or symbology 8, such as text reading "EXIT" and/or a running person image—this may be referred to as an exit identifier. The text or symbology of the marker layer 6 may be provided in positive or negative form, as described in more detail below. In various embodiments, the marker layer 6 is arranged to cause variations in transparency across the surface area of the sign 1, such that a glow from the photoluminescent material is visible in some regions but not others. In some embodiments, the marker layer 6 may be fully opaque and may be provided in one or more discrete regions as opposed to as a single continuous layer with varying transparency across the sign 1, such that photoluminescence is only visible in regions of the sign 1 not covered by the marker layer. The marker layer 6 may vary in color/may have a different color from the base layer 2 in embodiments in which the base layer 2 is visible, such that the exit identifier is visible in normal lighting conditions without relying on the luminescence.

It will be appreciated that the marker layer 6 may be differently shaped from the base layer 2, and may not extend across the whole base layer. For example, the marker layer 6 may be provided by, and indeed may consist of, ink printed onto the base layer 2 in the shape of an exit identifier. The ink, which may be UV-cured, is adhered to, and lies on top of, the base layer 2 in such embodiments. The ink constitutes the marker layer 6 in these embodiments. The ink may be selected to coat the base layer 2 as opposed to soaking into it, thereby providing a distinct layer covering a portion of the base layer 2, and increasing the thickness of the luminescent emergency exit sign 1. The marker layer 6 may comprise multiple discrete parts—e.g. separate, unjoined, shaped regions each forming a single letter of an exit identifier.

In some embodiments, a protective layer 10 is provided above the marker layer 6, on a side of the marker layer 6 remote from the photoluminescent base layer 2. The protective layer 10 is at least semi-transparent to wavelengths in the first range and the second range. The protective layer 10 may shield the marker layer and photoluminescent material from damage, and may be waterproof. The protective layer 10 may be a thin transparent film. An adhesive layer 14 may be provided to adhere the protective layer 10 to the marker layer 6. The adhesive 14 may be provided as part of the protective layer 10, as part of the marker layer 6, or separately. In some embodiments, the adhesive 14 may be provided in one or more discrete regions as opposed to as a uniform layer across the sign 1, or a different method of affixing a protective layer may be used. In alternative embodiments, no protective layer may be provided.

It is desirable that the protective layer 10 and adhesive layer 14 are both transparent, or at least partially transparent, to wavelengths in the first range and in the second range. The first range allows wavelengths that are absorbed by the photoluminescent material 4 to charge the photoluminescent materials. The second range allows emitted wavelengths to pass through the protective layer so as to allow a passenger to see the photoluminescence.

In alternative embodiments, there may be no separate marker layer 6. Instead, the layer 2 comprising the photoluminescent material 4 may itself provide one or more indicia (e.g. text, symbols, or images) to provide an exit identifier. The image or text may be provided by the distribution of the photoluminescent material 4 across the base layer 2. The base layer 2 may also be colored accordingly, optionally to allow the same indicia to be visible when the sign 1 is well-lit to the extent that the photoluminescence is not notably visible (common in normal lighting conditions). In such embodiments, any protective layer 10 present may lie directly above the base layer 2 (optionally with an intervening adhesive layer 14).

In embodiments in which the sign 1 is provided with a protective layer 10, the protective layer 10 is desirably arranged to cover substantially the entirety of the indicia and any photoluminescent border thereto, and to protect sign from wear and tear. The protective layer may have a finish selected from matt, gloss or anti-glare.

The base layer 2 of the embodiment of FIG. 1 comprises photoluminescent material 4. The photoluminescent material 4 can be provided on a substrate 12. In some embodiments the photoluminescent material 4 may be provided as a suspension of photoluminescent pigments in a resin. The underside of the base layer 2 may be described as forming a rear face of the sign 1, with the informational text or symbology being visible from the front.

On an underside of the sign 1 there is provided an adhesive layer 3; the adhesive layer 3, may be, for example, in the form of an adhesive spread onto the base layer 2, or a separate layer applied thereto. The adhesive layer 3 may be applied to, or formed as part of, the base layer 2, or there may be one or more intervening layers.

The adhesive layer(s) 3, 14 may comprise any suitable adhesive known in the art. Different adhesives may be used for different adhesive layers 3, 14 of the same sign 1.

The separation of layers 2, 3 depicted in FIG. 1, and the lack of intervening layers, are shown by way of example only, and not intended to be limiting.

In various embodiments, the adhesive layer 3 may be or comprise: (i) an even layer of an adhesive material spread across the underside of the sign 1; or (ii) one or more separate adhesive areas, or patches, on the underside of the sign 1.

The adhesive layer 3 is therefore optionally a continuous layer extending across the full area of the sign 1, but may comprise a plurality of discontinuous adhesive areas, or a single adhesive area smaller than the sign 1, in other embodiments.

A peel-off cover layer (not pictured) on the underside of the sign 1 may also be provided in some embodiments, to protect the adhesive layer 3 prior to use/to prevent the sign 1 from sticking to something unintentionally. Similarly, the peel-off cover layer may be a single piece, optionally extending across the full area of the sign 1, or may comprise multiple sections, or a shaped single piece, covering some or all of the area of the sign 1. The cover layer may generally be arranged to cover all of the adhesive, howsoever the adhesive is arranged, and may be made of paper (optionally coated paper).

The luminescent sign 1 is arranged to be stuck or adhered to an object or surface by means of the adhesive layer 3. The luminescent sign 1 may therefore be described as a decal.

In some embodiments, the adhesive layer 3 is arranged to be detachable from the surface to which it is applied, such that the luminescent emergency exit sign 1 can be temporarily installed and then removed later without damaging the sign 1 or the surface, e.g. by peeling off the sign 1. The adhesive layer 3 may be arranged to peel off, and the sign 1 may be immediately re-used (following re-charging, if necessary). However, in some cases, there may be a desire to avoid peel-off signs in case of passenger tampering—a more permanent adhesive material may be used in such cases. A solvent may be used to remove the photoluminescent sign 1 once it is no longer needed in such cases, or the sign may be peeled or ripped off a surface and a solvent used to remove any remaining adhesive on the surface. If the sign is not damaged, a new adhesive layer may be applied to allow it to be reused in such embodiments. Alternatively or additionally, a fitting 26 to which it is adhered may simply be replaced in some scenarios.

The marker layer 6 of the embodiment shown in FIG. 1 is provided adjacent to the photoluminescent base layer 2. The marker layer 6 can be a film. As an alternative, the marker layer 6 may be printed directly onto the photoluminescent layer, or onto an underside of the protective layer 10. The marker layer 6 may be printed using a UV-curable ink. The marker layer 6 may be, for example, formed from a solvent-based digital print or screen-print. The marker layer 6 is desirably at least partially opaque to at least electromagnetic emissions in the second range (the range emitted by the luminescent material). It is preferred that the marker layer is substantially opaque to at least electromagnetic emissions in the second range, at least in parts. In some embodiments the marker layer may comprise a colored film such as a black film. In some embodiments the marker layer may comprise a film, clear or colored, on which a dark or black ink has been printed. The marker layer 6 may comprise symbology or words in positive or negative form. In preferred embodiments the symbology or words can be printed onto a film, or more preferably in other embodiments be printed directly onto the photoluminescent layer 2. Symbology or words may be wording such as EXIT or arrows to indicate direction or other symbols such as an image of a running person. Where the symbology or words 8 are provided in positive form in the marker layer 6 (and so in negative form for the luminescent glow) the desired words or symbology may be printed on the marker layer 6. The printed portion 8 of the marker layer is selected to block the transmission of emitted light from the photoluminescent material. In the final product the symbology or wording will appear as a dark area on a glowing background in the sign in a low light level scenario. In some embodiments the marker layer may comprise a green, black, or red print on a film. It will be appreciated that red, black, or green text for "EXIT" is commonly used so likely to be familiar to passengers, and green print is common for running person images for exits. The print may be the wording or symbology. The print may be a layer with the words or symbology in negative (such that the exit identifier is visible in positive form with the luminescent glow). The print color/other marker layer color may therefore be selected to provide a familiar visual sign when the photoluminescent sign 1 is well-lit such that its photoluminescent glow is negligible (i.e. the luminescence may not be noticeable under normal lighting conditions), and to shape the visible photoluminescent glow when the sign 1 is less well-lit.

Where the symbology or words are provided in negative form in the marker layer 6, the symbology or wording 8 will appear as a glowing area on a dark background in the emergency sign 1 in a low light level scenario. In some embodiments a print may be made of an opaque material over a surface area of the marker layer with unprinted areas on the layer forming the words of symbology. In other arrangements the words or symbology could be formed by cut out(s) in an opaque film. The words or symbology may be provided by an aperture in the film or in another embodiment by a portion of the layer where there is no printing on the photoluminescent material.

The marker layer 6 may therefore provide information arranged to be visible in well-lit conditions—e.g. standard, printed black and white or color information, arranged to be visible without the need for photoluminescence, simply in cabin lighting if/when the cabin is well-lit.

In embodiments with a marker layer, it is desirable that the marker layer 6 is transparent or at least partially transparent, to wavelengths in the first range and in the second range in any regions in which photoluminescence is intended to show through. Transparency in the first range allows wavelengths that are absorbed by the photoluminescent material to reach and charge the photoluminescent materials. Transparency in the second range allows emitted wavelengths to pass through the relevant portion(s) of the marker layer, so as to reach a viewer.

The photoluminescent material 4 in the base layer 2 exhibits persistent luminescence. The photoluminescent layer 2 may be arranged to emit blue or green light.

Typically the photoluminescent material comprises a strontium aluminate. In a preferred embodiment the photoluminescent material may be selected from blue emitting $Sr_4Al_{14}O_{25}Eu$, Dy and green emitting $SrAlO_4Eu$, Dy. The photoluminescent material is excited, or charged, by electromagnetic wavelengths in the first range. The excitation wavelengths in the first range may be from 250 nm to 470 nm.

In some embodiments the photoluminescent material emits electromagnetic wavelengths in the range from 400 to 800 nm. The second range may from 400 nm to 600 nm or from 450 nm to 500 nm. The photoluminescent material may be emitting wavelengths in the second range that are blue and may be substantially 490 nm. In other embodiments the second range may be from 450 nm to 700 nm or from 500 nm to 600 nm or more preferably from 500 nm to 550 nm. In some embodiments the photoluminescent material may be emitting wavelengths second range that are green and may be arranged to be around 520 nm.

Importantly, provided that the photoluminescent material is charged, in a low ambient light scenario light emitted from the photoluminescent material passes through at least a portion of any marker layer and/or protective layer and the emergency signage or symbols is visible to the passengers and crew of the aircraft. Typically, a low light scenario is one in which normal electric lighting in the aircraft has failed and the cabin is dark. It will be appreciated that the light emitted can be in the range to which the human eye is sensitive in scotopic vision. A level or intensity of light output from the photoluminescent material may then be lower than would be needed if the light output is in a different range of wavelengths.

In a normal lighting scenario, the ambient light is reflected from the sign, which may show similar information to that shown by the photoluminescence in lower lighting conditions (e.g. due to printing on, or as part of, a marker layer 6, or to coloring of the base layer 2 itself). Emissions from the photoluminescent material are relatively much lower than the reflected light and are generally not perceived by passengers or crew under normal lighting conditions. Consequently, the sign 1 may provide information (which may or may not be the same) under two different lighting conditions. It will be appreciated that, for emergency exit signs, it may generally be the same information that is arranged to be shown in both lighting scenarios. However, in some cases there may be differences, such as additional information being visible in normal lighting. For example, the printed information on the marker layer 6 visible in normal lighting conditions may mark an exit 28 as an emergency exit and also provide text instructions for passengers sat in the emergency exit row (e.g. regarding positioning of bags). By contrast, the photoluminescence may be arranged to show less and/or simpler information—for example simply reading "EXIT", optionally with an accompanying arrow. In other examples, the information provided may be equivalent under both lighting scenarios.

The photoluminescent emergency exit sign 1 of various embodiments therefore comprises an exit identifier arranged to be lit (e.g. made visible, or made more visible) in low-light conditions by a photoluminescent glow from the photoluminescent layer. It will be appreciated that, depending on light levels and print contrast, the exit identifier may be visible in low-light conditions even without photoluminescence, but the photoluminescence may improve its visibility. The photoluminescence may therefore augment its visibility.

The exit identifier may comprise one or more words and/or symbols which are formed by shaping of the photoluminescent layer, either in a positive fashion (such that the exit identifier—e.g. the word "EXIT" or a running figure—glows) or in negative fashion (such that the exit identifier—e.g. the word "EXIT" or a running figure—shows up as dark lettering on a glowing background). The distribution of the photoluminescent material 4 in the base layer 2 may therefore be arranged such that the indicia, or a mask for the indicia, are formed by the positioning of the photoluminescent material.

Alternatively or additionally, the exit identifier may comprise one or more words and/or symbols which are formed by masking of a part of the photoluminescent layer, e.g.

using a marker layer 6 as described above. The mask may form the indicia, such that the exit identifier—e.g. the word "EXIT"—shows up as dark lettering on a glowing background, the exit identifier being formed by a mask over the photoluminescent layer, or the mask may provide a negative of the indicia such that the indicia glow. In such examples, the distribution of the photoluminescent material 4 in the base layer 2 may be even across the base layer.

Dark areas may therefore be formed by masking of parts of an optionally uniform photoluminescent layer, or by gaps in the photoluminescent material. Glowing areas may therefore be formed by not covering selected regions of an optionally uniform photoluminescent layer, or by shaping/positioning photoluminescent material appropriately within the base layer.

The exit identifier may therefore be shown in positive or negative form, but in either case is photoluminescently shown.

Figure 7:
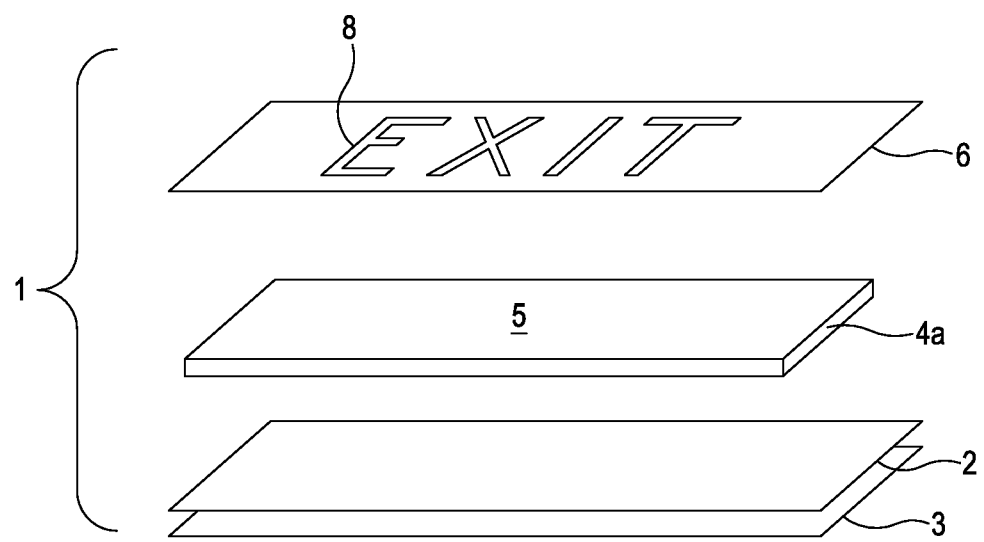
FIG. 7 is a schematic view of a chemiluminescent exit sign in accordance with various embodiments of the invention.

FIG. 7 illustrates a luminescent sign 1 of another embodiment. The luminescent sign 1 of FIG. 7 is chemiluminescent, and not photoluminescent. The same reference numerals are used for the base layer 2, the marker layer 6, the adhesive layer 3, and the indicia 8, which all perform the same roles as described above for the photoluminescent embodiments.

The photoluminescent material 4 of the embodiment of FIG. 1 is replaced with a chemiluminescent material 4a. The chemiluminescent material 4a may be in the form of a liquid, solution, or suspension. The chemiluminescent material 4a may be formed from a mixture of two (or more) different substances—mixing these substances may start a chemiluminescent chemical reaction, so activating the chemiluminescent sign. The substances may be or comprise hydrogen peroxide, oxalate esters (e.g. trichlorsalicylate oxylate esters), and one or more selected dyes to provide a desired color, or other appropriate chemicals as known in the art may be selected. It will be appreciated that chemiluminescence may not commence until after activation, but that the presence of both/all of the unmixed components in an arrangement which allows them to be mixed on activation provides material that is capable of providing chemiluminescence. For ease of description, the plurality of unmixed components is therefore also referred to as "chemiluminescent material".

The chemiluminescent material 4a of the embodiment of FIG. 7 is encapsulated and contained within a pouch or other container 5. The container or pouch 5 is arranged to be deformable, at least in part, so as to facilitate activation of the chemiluminescent material 4a, and may be made of or comprise a flexible plastic material. A plurality of containers or pouches 5 may be used in some embodiments.

A breakable vial or other container (unshown) may be located within the container 5 and arranged to break when the container 5 is deformed, so as to allow a component within the vial to mix with a component outside of the vial but still within the container 5. Further deformation (e.g. squeezing or massaging) of the container 5 may help to ensure that the components are well-mixed so as to provide a more even and/or stronger glow.

The need for a container 5 for a liquid component 4a may lead to chemiluminescent signs 1 being thicker than their photoluminescent counterparts in some cases, but thicknesses of less than or equal to 4 mm, 3 mm, 2 mm, or 1.5 mm may still be obtained. The chemiluminescent sign 1 may therefore still be sufficiently flexible to conform to a surface to which it is applied in many embodiments. A protective layer, if present, may add around 0.5 mm to sign thickness as compared to the same sign without a protective layer.

A front surface area of the sign 1 is likely to be the same for all types of luminescence—being selected to cover an electrical exit sign—as discussed in more detail below. In some embodiments, for example for larger chemiluminescent signs, a set of containers 5 may be provided across a base layer 2. Separating the chemiluminescent material 4a into smaller compartments than the overall sign dimensions may facilitate even mixing of the components on activation.

In the embodiment shown, the base layer 2 is located behind the container 5; in other embodiments, a lower surface of the container may provide the base layer 2. The base layer 2 may be a flexible film or foil, and may be opaque. In other embodiments, a rigid base layer 2 may be provided, for example in the form of a plate—some deformability/flexibility of the container 5 is nonetheless generally provided to allow activation of the material 4a therewithin. In some embodiments, however, the container may be rigid and a separate moving part—e.g. a screw or plunger passing through a wall of the container—may be provided to allow activation of the chemiluminescent material 4a. It will be appreciated that such a feature may add expense and possibly an additional failure point, but may be a viable alternative to deforming the container 5 for activation in some embodiments—for example if impacts on the sign are expected and a ridged protective layer 10 is provided. In some embodiments, a protective layer 10 may be applied after the sign 1 is activated, so potentially allowing the material to be activated by deforming the container 5 before the container is then protected by a more rigid cover 10.

In the embodiment shown, at least an upper surface of the container or pouch 5 is at least substantially transparent to radiation emitted by the chemiluminescent material 4a. The entire container 5 may be transparent in some embodiments.

In the embodiment shown, a marker layer 6, e.g. including lettering or symbols printed on a film, is applied to the upper surface of the container 5, so as to provide an exit identifier, as for the marker layer 6 described above. For example, a film or other marker layer 6 may be laminated onto the container.

In other embodiments, an exit identifier may be provided as part of the upper layer of the container 5, with some of the upper layer of the container 5 being at least substantially opaque to the wavelength range of the chemiluminescence, and other portions being at least substantially transparent such that glowing and dark regions are formed.

In other embodiments, an exit identifier may be printed onto an upper layer of the container 5. However, it will be appreciated that some chemiluminescent materials 4a are broken down by UV light, and that UV curing of a printed ink on the container 5 may therefore be inappropriate. An ink which does not require UV curing may therefore be selected in embodiments using an exit identifier printed onto the container 5, or the container 5 may be printed before it is filled with the chemiluminescent material 4a, or a mask may be applied around the exit identifier to allow it to be UV-cured without UV light reaching the chemiluminescent material 4a.

In still other embodiments, the container 5 may be shaped so as to form the indicia by controlling where the chemiluminescent material 4a can be present—e.g. pillars within the container may create solid regions with no chemiluminescent material 4a, and/or the container 5 may take the shape of a word or symbol. In such cases, the container 5 may comprise a set of individual containers—e.g. one for each letter of a word or each separate part of a symbol—which may or may not be fluidly linked.

As for the photoluminescent signs, a protective layer 10, optionally attached with an adhesive layer 14, may also be used—either applied directly to the container 5 or above the marker layer 6 if present.

It will be appreciated that, whichever kind of luminescent material is used, the sign 1 must meet aerospace requirements. These include DO-160 for environmental requirements such as the effects of temperature, altitude, humidity, shock and crash safety, vibration, water and fluid susceptibility, flammability etc. Signs must meet the requirements of CS/FAR25.853 with regard to flammability resistance.

The luminance of the sign must also meet the requirements of CS 25.812 and CS23.2315 for large aeroplanes or CS 29.812 for large rotorcraft for safety critical signage, particularly where the signs are used for emergency exit signs. In small aircraft or rotorcraft the sign may need to meet the requirements of CS27.805 and CS27.807.

The luminescent emergency exit sign 1 of various embodiments is flexible, such that it can adapt to the shape of a surface to which it is applied. The sign 1 may therefore stick to a curved cabin wall 24, or to a flat wall portion or fitting 26, and may bend around corners of the surface to which it is applied. The sign 1 may be smoothed into place by hand.

The luminescent emergency exit sign 1 of various embodiments is sized and shaped to cover an electrical emergency exit sign 26 when the adhesive layer is applied to the electrical emergency exit sign 26. It will be appreciated that electrical emergency exit signs 26 of different aircraft 22 may have different dimensions, and that even within the same aircraft cabin 20, differently-dimensioned signs may be present, for example positioned by different emergency exits 28, or at different locations 26a, 26b within the cabin. The dimensions may therefore be selected as appropriate for the electrical emergency exit sign 26 the luminescent sign 1 is intended to replace.

The luminescent emergency exit sign 1 may have a surface area (in particular, of a front face of the sign on which indicia are visible) of between 9 $cm^2$ and 400 $cm^2$, and optionally between 25 $cm^2$ and 400 $cm^2$, and optionally between 25 $cm^2$ and 50 $cm^2$. The sign 1 may have an area of around 40 $cm^2$ in some embodiments.

The sign 1 may be square or rectangular in shape, for example having dimensions of 3 cm by 3 cm, or 10 cm by 4 cm.

The sign 1 may be much thinner in the third dimension, such that the sign is flat, and may be no thicker than a piece of card. In some embodiments, the sign 1 may have a thickness is the range from 0.5 mm to 2 mm, and optionally from 0.5 mm to 1.5 mm. The photoluminescent layer of the sign 1 may have a thickness of around 0.7 mm in some embodiments, and may make up the majority of the sign thickness.

A protective layer, if present, may add around 0.5 mm to sign thickness as compared to the same sign without a protective layer.

Figure 3:
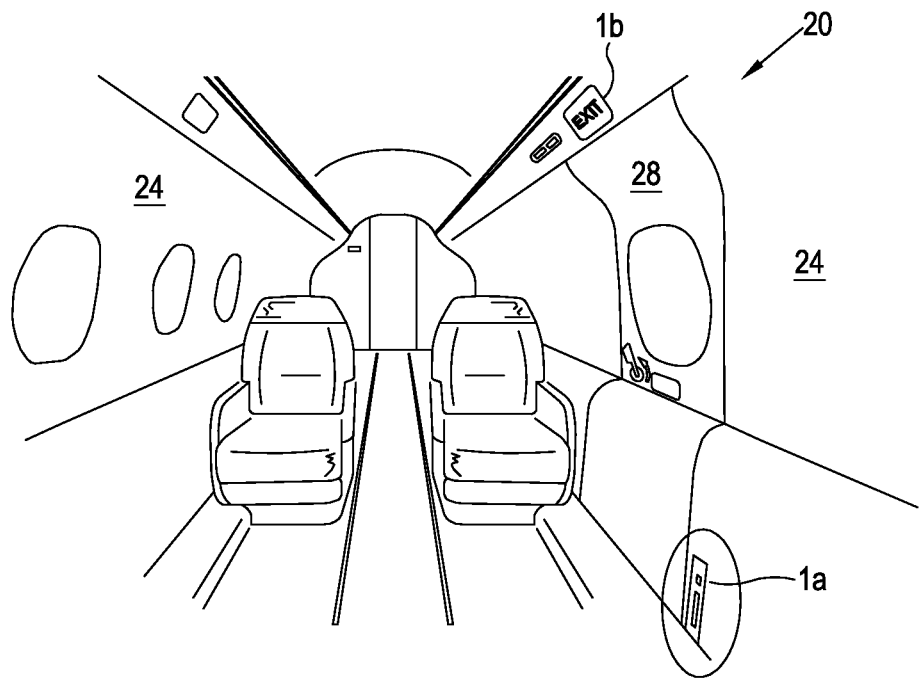
FIG. 3 is a schematic view of a cabin of an aircraft, including an aircraft cabin lighting system of an embodiment.
Figure 4:
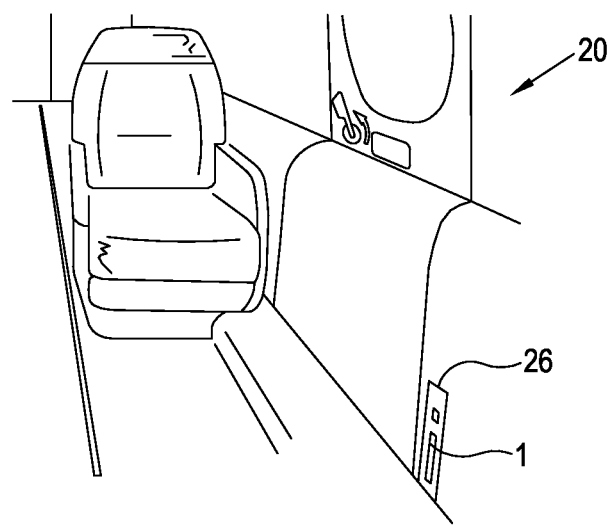
FIG. 4 is a schematic view of an aircraft cabin fitting with a luminescent sign mounted thereon, within an aircraft cabin.

As illustrated in FIG. 3, it is intended that the luminescent sign(s) 1 will be utilised in a cabin 20 in an aircraft 22. FIG. 3 illustrates one low-level sign 1a and one high-level sign 1b. The sign 1 may be adapted to be secured to a wall 24 in the cabin 20 or to be secured to a fitting in the cabin 20 of the aircraft 22, such as being adhered to an electric emergency exit sign 26 as shown in FIG. 4. In some embodiments, the sign 1 may be adapted to be secured to an emergency exit door 28 in the cabin 20 of the aircraft 22

It will be appreciated that the luminescent sign 1 is used to be indicative of the location of an emergency exit 28.

Generally, low-level signs may indicate the immediate presence of an emergency exit, and high-level signs may direct a viewer to one or more emergency exits (e.g. being located spaced from an emergency exit and providing an arrow towards such an exit) and/or indicate the immediate presence of an emergency exit (e.g. being directly above an emergency exit door).

Figure 5:
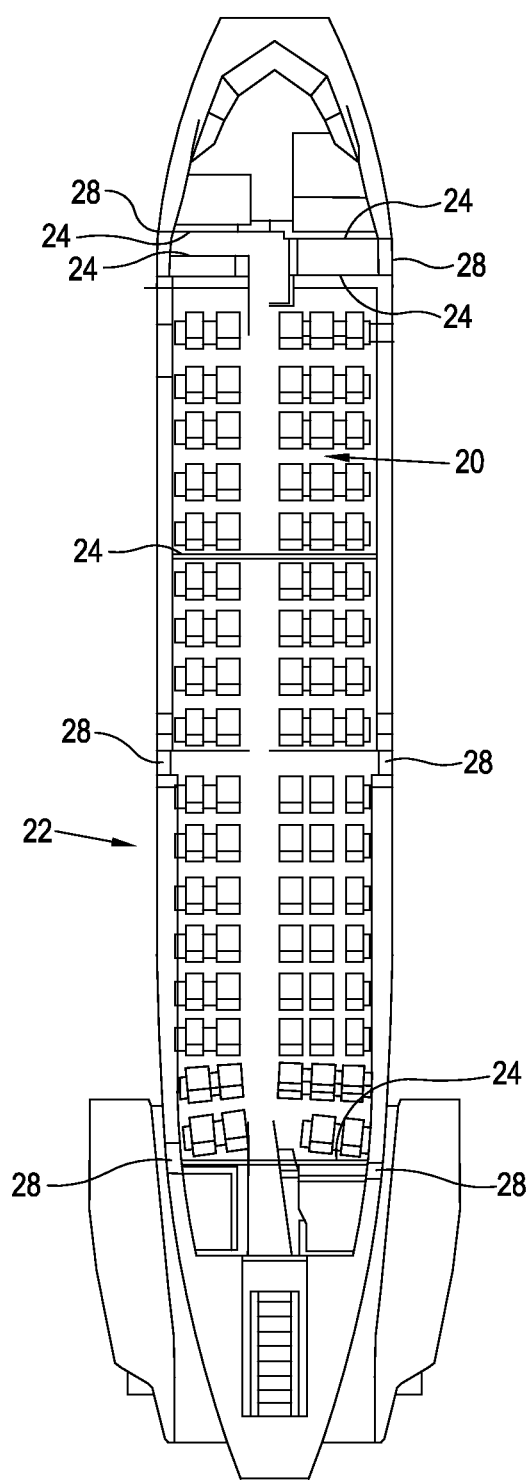
FIG. 5 is a schematic view of an aircraft in which embodiments of the invention may be implemented.

FIG. 5 is a schematic indication of an aircraft in accordance with the invention in which the location of emergency exits 28 are indicated by location of signs on walls 24 of the cabin 20.

An aircraft cabin lighting system comprises one or more cabin lighting units 26, each cabin lighting unit 26 comprising an emergency exit sign which is arranged to be electrically illuminated. These are fittings 26 of the aircraft cabin 20, and not intended to be removed between services. If one or more bulbs in one of these electrical emergency exit signs 26 fails, or if another fault causes the electrical sign 26 to fail, the aircraft 22 may be grounded (or not allowed to fly with any passengers) until that fault is fixed, due to stringent safety standards.

In aircraft cabin lighting systems of the invention being described herein, one or more luminescent signs 1 as described above are provided. Desirably, these are stored in a location known to cabin crew, but not accessible by passengers.

In case of a failure of an electrical sign 26, a luminescent sign 1 can be retrieved, activated and/or optionally charged if required, and then positioned suitably so as to mark the exit 28 for which the electrical sign 26 has failed. In some cases, the sign 1 may be photoluminescent and may be illuminated whilst in storage well enough that it is already sufficiently charged on retrieval, so a deliberate charging step may not be required. The luminescent sign 1 may be adhered to a cabin wall 24 adjacent to the failed electrical sign 26, or may be adhered to the failed electrical sign 26 itself, optionally completely covering the failed fitting 26.

The luminescent sign 1 may be adhered to the exit door itself 28 in some scenarios, although this may no longer be visible inside the cabin once the door is opened, so may not be desirable.

Safety requirements for providing guidance to passengers and crew are therefore met by providing the luminescent sign 1 in an emergency scenario, such that the aircraft 22 is able to continue with its intended flight. Additionally the aesthetic appearance of a cabin is not reduced by the intrusion of additional emergency signage in normal use if the luminescent sign 1 covers the failed fitting 26, whilst still allowing safety requirements to be met.

Figure 2:
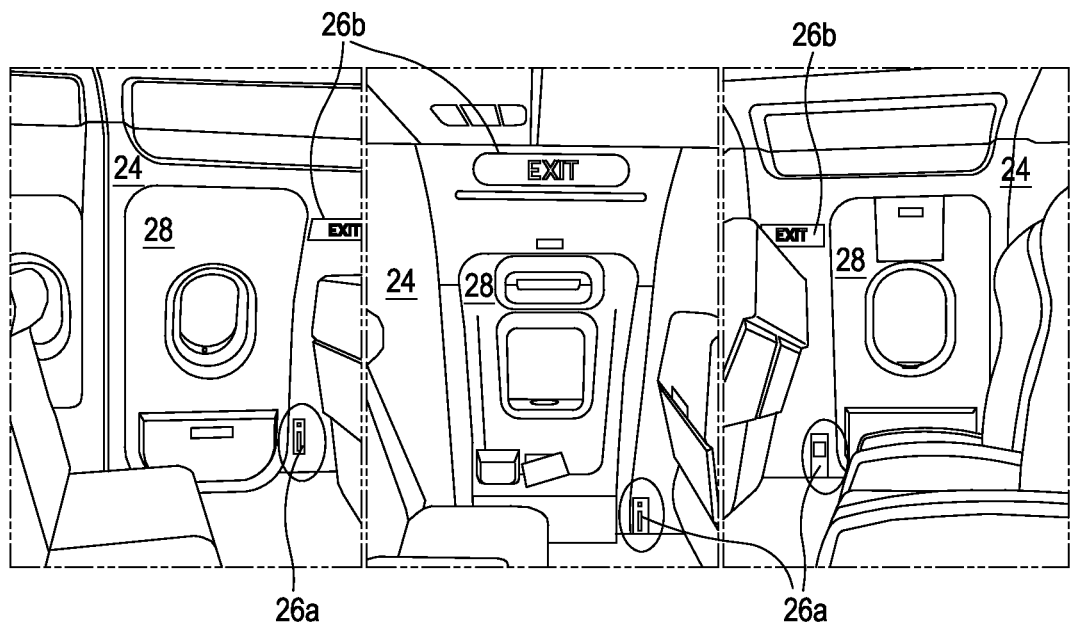
FIG. 2 (Prior Art) provides examples of three prior art electrical low-level exit signs, demonstrating general positioning and dimensions thereof.

FIG. 2 (prior art images) shows three examples of aircraft cabin emergency exits 28 with electrical exit signs 26—in particular, these cabins 20 each have a "low-level" exit sign 26a and a higher-level exit sign 26b for each emergency exit door 28.

The higher-level exit signs 26b are generally located on a wall 24 of the cabin 20, often near or adjacent to an upper side of the emergency exit door 28—for example being centrally located above the door 28, or located adjacent to or near an upper corner of the door 28. High-level exit signs 26b may also be provided further from the exits, directing passengers towards the exits.

The low-level exit signs 26a are generally located on a wall 24 of the cabin 20, near or adjacent to a lower corner of the emergency exit door 28. Low-level exit signs are located less than 122 cm (48 inches) above a floor of the aircraft cabin 20, and generally less than 50 cm or 30 cm above the floor. Low-level exit signs generally form part of, or are associated with, floor-path emergency route markings, such that, in case of an emergency with poor visibility (e.g. due to smoke and/or failure of the main cabin lights), a passenger following the floor-path markings will be guided to an emergency exit 28 marked with such a sign 26*a*. The low-level exit signs 26*a* are located below the tops of chairs provided for passengers, and often (as shown in the central and right-hand examples of FIG. 2) at or below the seat level such that they are level with a passenger's lower legs when seated. The low-level exit signs 26*a* are generally located on, or at least substantially parallel to, a cabin wall 24, facing into the cabin 20.

Depending on cabin configuration, and on whether any bulbs or other cabin lights are not on, or indeed not working (which may be described as the MMEL condition of the cabin), this positioning may be at least substantially perpendicular to most cabin lighting, which may be ceiling-mounted and downwardly directed. These low-level exit signs 26*a* may therefore not be well-lit by cabin lighting, as the light may be blocked by passengers, seats, tray-tables, and similar, and additionally the signs may not face the cabin lights. The light level (Lux) may therefore be too low for charging of photoluminescent materials in these locations in some scenarios, due to cabin lighting being blocked or not on and/or the location being in shadow. High level exit signs may have some of the same issues, depending on cabin lighting arrangements. Electrical light fittings 26*a* are used due to a prejudice against the use of photoluminescence for exit signs for emergency exits 28 (by contrast, floor-path markings along aisles may be much less likely to be continually obstructed/shaded over the duration of a flight, and face upwards towards cabin lights, and photoluminescent floor-path markings are known).

Figure 6:
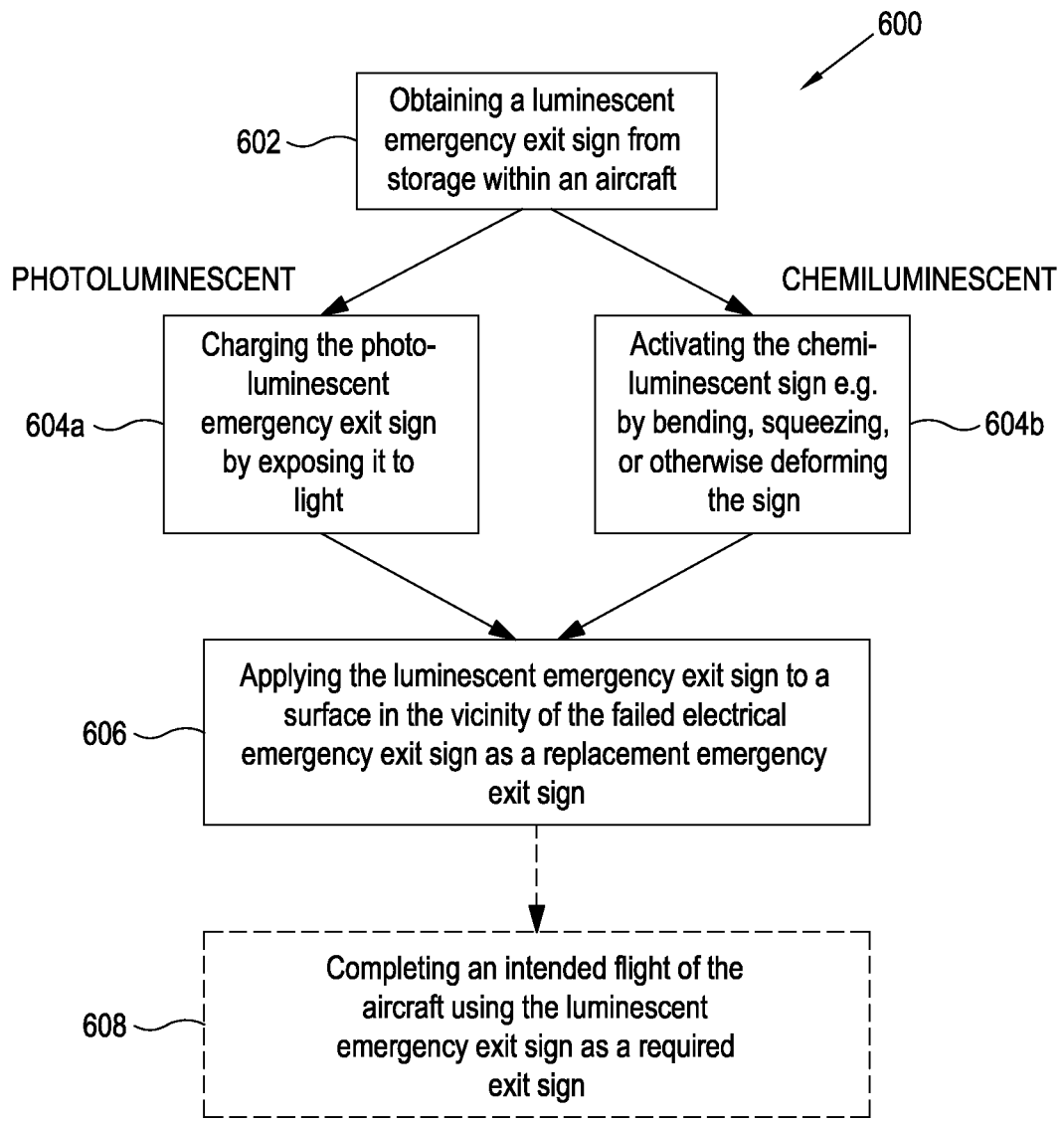
FIG. 6 illustrates methods of various embodiments.

Various methods 600 of embodiments of the invention are illustrated in FIG. 6.

A method 600 of providing emergency exit lighting in an aircraft cabin 20 comprises, in response to failure of an electrical emergency exit sign 26, obtaining 602 a luminescent emergency exit sign 1 from storage.

The luminescent emergency exit sign 1 may be obtained from a storage location within the aircraft 22, and optionally within the aircraft cabin 20. Alternatively, the luminescent emergency exit sign 1 may be made available at an airport or other facility and fetched as appropriate. Preferably, an aircraft 22 may carry a plurality of luminescent emergency exit signs 1 as described herein, suited to its electrical emergency exit signs 26 and/or to other features of its aircraft cabin lighting system—for example, the signs 1 may be sized and shaped to fit well over, or adjacent to, the electrical emergency exit signs 26, and/or to match floor-path markings in color.

The or each luminescent emergency exit sign 1 comprises an adhesive layer 3 arranged to allow the luminescent emergency exit sign 1 to be adhered to a surface, such as a cabin wall 24 or a (failed) electrical emergency exit sign 26.

For photoluminescent signs 1, the method 600 further comprises charging 604*a* the photoluminescent emergency exit sign 1 by exposing it to light. In some embodiments, the photoluminescent emergency exit sign 1 may be stored in a well-lit location, such that the charging is complete before the sign 1 is retrieved 602. In other embodiments, especially in embodiments in which photoluminescent emergency exit signs 1 are stored within the cabin 20, the signs 1 may be in a cupboard, pouch, packet, or similar, and the photoluminescent material therein might not be charged at all, much less fully charged, when retrieved 602. Charging 604*a* may therefore be performed before and/or after obtaining 602 the photoluminescent emergency exit sign 1.

Conveniently, having an easily portable photoluminescent emergency exit sign 1 allows the sign 1 to be charged in many different ways—for example, on a sunny day it may be positioned outside in direct sunlight so as to charge more quickly than it would from cabin lighting, or if airport/runway floodlights or landing lights, spotlights, or similar are lit, it may be held facing such a light. Even if limited to lights available within an aircraft cabin 20, the sign 1 may be held directly in front of a cabin light. The weight and dimensions of the sign 1 may be such that it can easily be held in a desired charging position by hand, or with tape, adhesive putty (e.g. Blu-Tack®) or similar, or simply propped up if appropriate.

Cabin lighting may be sufficient to charge the photoluminescent sign 1 in some embodiments.

In some embodiments, the aircraft cabin lighting system may further comprise a dedicated charging light arranged to be used to charge the photoluminescent emergency exit sign 1. Such a light may be stored with the one or more photoluminescent emergency exit signs 1, and may be or comprise a torch (US English: flashlight) or lamp.

Such a dedicated charging light may be arranged to provide light with wavelengths in a range selected to be best absorbed by the photoluminescent material, for efficiency of charging.

For example, the charging light may provide light with one or more wavelengths in the range from 350 nm to 500 nm, 400 to 500 nm, or 365 to 450 nm. The charging light may provide blue and/or UV light. It will be appreciated that aircraft cabin lighting may not include much blue light (with warmer colors often being preferred), and that UV light may be avoided, or absorbed by cabin light covers. A dedicated charging light providing light in a targeted wavelength range may therefore provide much more efficient charging of the photoluminescent sign 1, even for the same brightness/Lux level. Similarly, moving the sign 1 outside for charging in daylight may provide a broader charging spectrum, including more light of the desired wavelengths. A minimum Lux value of 500 to 1000 Lux may be desired for swift charging.

Charging of the sign 1 may be complete within five minutes in some cases. It will be appreciated that the intensity and wavelength range of available light will affect charging time for a given photoluminescent sign 1. Different photoluminescent materials may also take longer to charge and/or charge more effectively from different wavelength ranges. Typical charging times may range from 5 minutes to 45 minutes.

In various embodiments, charging of the sign 1 may be complete after 1 hour, 45 minutes, 30 minutes, 15 minutes, 10 minutes, 5 minutes, or 2 minutes of exposure of the sign 1 to a light source. Any delay in the aircraft 22 taking off may therefore be minimal, and hugely reduced as compared to the time required for returning the aircraft 22 to a maintenance bay, or for locating and calling out an engineer and the correct parts of the failed electrical sign 26.

In embodiments using chemiluminescent signs 1, the charging step 604*a* may be replaced with an activation step 604*b*.

As part of the obtaining 602 or activating 604*b* step, the chemiluminescent sign 1, or the material container 5 for a chemiluminescent sign 1, may be removed from opaque packaging (e.g. a sealed foil or opaque plastic pouch). This packaging may protect the chemiluminescent material 4*a* from degradation due to UV light.

In some embodiments, a kit of parts comprising a material container 5 and a separate marker layer 6 for application to the container 5 may be provided. In other embodiments, the sign 1 may be provided pre-assembled, and optionally there may not be a separate marker layer, the exit indicia instead being incorporated into the container 5 using any of the techniques discussed above. A preparation step of applying a marker layer 6, and optionally also a protective layer 10, so as to assemble the sign 1 may therefore also be performed.

Activation 604b may comprise deforming the sign 1, and more specifically the container 5, so as to mix two or more components within the container 5 and trigger chemiluminescence. The container 5 may be bent, squeezed, twisted, massaged, and/or otherwise deformed so as to mix the components. This deformation may rupture, smash, or otherwise break a barrier or sub-container within the container 5, so allowing the components to mix.

Alternatively or additionally, activation 604b may comprise moving a moveable component of the container 5—e.g. a screw, lever, or plunger—so as to rupture, smash, or otherwise break a barrier or sub-container within the container 5, so allowing the components to mix, without deforming an (optionally rigid) wall of the container 5.

Activation 604b may take a matter of seconds, or indeed less than a second. In some embodiments, forces applied to the container 5/sign 1 in removing it from packaging and/or adhering it to a surface may be sufficient to activate the material—the activation step 604b may therefore not be necessarily separate from other steps of the method.

In embodiments in which both photoluminescent material 4 and chemiluminescent material 4a is present, charging 604a and activation 604b may both be performed. Preferably, the (generally longer) charging step 604a may be performed at least substantially before the activation step 604b in some such cases so as to maximise the useful lifespan of the chemiluminescent glow.

A different charging and/or activation step 604 may be provided for different kinds of luminescence—for example, diluting a saline solution with water to cause a reduction in salinity can force bioluminescent algae to glow, so adding water to a container could be used as an activation step 604b. The charging and activation steps 604 described herein are therefore provided by way of example only, and not intended to be limiting.

The method 600 further comprises applying 606 the luminescent emergency exit sign 1 to a surface in the vicinity of the failed electrical emergency exit sign 26a such that the adhesive layer 3 holds the luminescent emergency exit sign 1 in place as a replacement emergency exit sign. The surface may be a cabin wall 24, or indeed a surface of the failed electrical emergency exit sign 26a.

Applying 606 the luminescent emergency exit sign 1 to the surface may comprise peeling off, or otherwise removing, a cover layer protecting/covering the adhesive material 3 and pressing the sign 1 into position.

The adhesive layer 3 of the luminescent emergency exit sign 1 may be applied 606 to a surface of the failed electrical emergency exit sign 26a. The electrical emergency exit sign 26a may therefore be partially or completely covered by the luminescent emergency exit sign 1. Advantageously, this may prevent any confusion from two exit signs being visible (in normal lighting conditions) were the luminescent emergency exit sign 1 instead placed adjacent to or nearby to the failed electrical sign 26.

In embodiments using photoluminescence, the charging 604a of the photoluminescent emergency exit sign 1 may comprise holding the photoluminescent emergency exit sign 1 adjacent to a light source before positioning it 606 as a replacement emergency exit sign in some cases, but the charging 604a may be performed after the photoluminescent emergency exit sign 1 is applied 606 to the surface in other examples—for ease and speed of charging, a portable light source such as a torch (US English: flashlight) may be used to provide more light for charging than would be available otherwise within the cabin 20. This may be of particular importance for low-level emergency exit signs, or for high-level emergency exit signs in shaded positions.

In embodiments of the method 600 using a dedicated charging light, the dedicated light may be used to charge the photoluminescent emergency exit sign 1 prior to it being adhered to the surface, or after it has been adhered to the surface. The dedicated charging light may be moved and positioned as appropriate.

The method 600 may therefore allow an aircraft 22 to be "repaired" so as to meet safety standards relating to numbers of emergency signs in a relatively short time-period, without highly technically-trained staff, and/or without needing to return the aircraft to a service point. The aircraft 22 may therefore be allowed to complete its intended flight, with little or no delay to the intended departure time (depending on how quickly the fault is noted and a charging time of the photoluminescent sign 1).

The method 600 of providing emergency exit lighting in an aircraft cabin 20 may form part of a method of maintaining flight-worthiness of a passenger aircraft 22 in instances of failure of an electrical emergency exit sign 26 such that the aircraft 22 can be flown back to a service point. The method 600 may therefore further comprise completing 608 an intended flight of the aircraft 22 using the luminescent emergency exit sign 1 as a required exit sign, in place of a failed electrical exit sign.

The method 600 may further comprise servicing the aircraft 22 to repair or replace the failed electrical emergency exit sign 26 in advance of a next flight of the aircraft.

The luminescent sign 1 as described herein is generally used for a single flight only (or perhaps two relatively short "hops" with a minimal stop-over therebetween). The luminescent sign 1 is selected to have an emission duration/discharge profile sufficient to keep luminance above the minimum required by the standards for the duration of the flight, but its luminance may well decay below that required minimum shortly thereafter, especially in scenarios in which a photoluminescent sign is used in a shaded location, or in which a flight/usage period of over 6-10 hours is required for a chemiluminescent sign. Due to the low exposure to light in normal operations at in some sign positions, little or no recharging of the photoluminescent material of a photoluminescent sign 1 may occur in normal aircraft operation for some exit sign positions (unlike for floor-path markings, which are generally well-lit by cabin lighting, so recharged throughout a flight under normal conditions).

The luminescent emergency exit sign 1 may be detached from the failed electrical emergency exit sign 26 prior to servicing. In some cases, the adhesive layer 3 may be selected such that the sign 1 peels off cleanly, and the sign 1 may be re-useable (in the case of photoluminescence, generally without any treatment of the photoluminescent material being needed). In other cases, the sign 1 may be designed for one-shot use, and may not be intended to be re-usable.

What is claimed is:

1. An aircraft cabin lighting system comprising at least one cabin lighting unit, each cabin lighting unit comprising an electrical emergency exit sign arranged to be electrically illuminated; and at least one luminescent emergency exit sign, the luminescent emergency exit sign being portable, comprising an adhesive layer arranged to allow the luminescent emergency exit sign to be adhered to a surface, and being arranged to be adhered to a surface in the vicinity of the electrical emergency exit sign in use.

2. The aircraft cabin lighting system of claim 1, wherein the luminescent emergency exit sign is at least one of:
 (i) photoluminescent; or
 (ii) chemiluminescent.

3. The aircraft cabin lighting system of claim 1, wherein the electrical emergency exit sign is a low level exit sign, and is at least one of:
 (i) located adjacent to a lower corner of an emergency exit; or
 (ii) located less than 50 cm above a floor of the aircraft cabin.

4. The aircraft cabin lighting system of claim 1, wherein the luminescent emergency exit sign is flexible such that it can adapt to the shape of a surface to which it is applied.

5. The aircraft cabin lighting system of claim 1, wherein the luminescent emergency exit sign is sized and shaped to cover the electrical emergency exit sign when the adhesive layer is applied thereto.

6. The aircraft cabin lighting system of claim 1, wherein the adhesive layer is arranged to be detachable from the surface of the electrical emergency exit sign, such that the luminescent emergency exit sign can be temporarily installed, and then removed.

7. The aircraft cabin lighting system of claim 1, wherein the luminescent emergency exit sign comprises a luminescent layer, and an exit identifier arranged to be lit by the luminescent layer.

8. The aircraft cabin lighting system of claim 1, wherein the luminescent emergency exit sign comprises an exit identifier, and wherein the exit identifier comprises at least one of a word and a symbol which is at least one of:
 (i) formed by shaping of the luminescent layer; or
 (ii) formed by masking of a part of the luminescent layer.

9. The aircraft cabin lighting system of claim 7, wherein the luminescent layer is a photoluminescent layer.

10. The aircraft cabin lighting system of claim 1, wherein the luminescent emergency exit sign is a photoluminescent emergency exit sign, and is arranged to be chargeable with ambient cabin light.

11. The aircraft cabin lighting system of claim 1, wherein the luminescent emergency exit sign is a photoluminescent emergency exit sign, and is arranged to be charged using light with a wavelength in the range from 350 nm to 500 nm.

12. The aircraft cabin lighting system of claim 1, wherein the luminescent emergency exit sign is a photoluminescent emergency exit sign, and the system further comprises a dedicated charging light arranged to be used to charge the photoluminescent emergency exit sign.

13. The aircraft cabin lighting system of claim 1, wherein the luminescent layer is a chemiluminescent layer.

14. The aircraft cabin lighting system of claim 1, wherein the luminescent emergency exit sign is a chemiluminescent emergency exit sign, and is arranged to be activated by deforming the chemiluminescent layer.

15. A method of providing emergency exit lighting in an aircraft cabin, the method comprising, in response to failure of an electrical emergency exit sign:
 obtaining a luminescent emergency exit sign from storage, the luminescent emergency exit sign comprising an adhesive layer arranged to allow the luminescent emergency exit sign to be adhered to a surface;
 activating the luminescent emergency exit sign; and
 applying the luminescent emergency exit sign to a surface in the vicinity of the failed electrical emergency exit sign such that the adhesive layer holds it in place as a replacement emergency exit sign.

16. A method of maintaining flight-worthiness of a passenger aircraft in instances of failure of an electrical emergency exit sign such that the aircraft can be flown back to a service point, the method comprising:
 obtaining a luminescent emergency exit sign from storage, the luminescent emergency exit sign comprising an adhesive layer arranged to allow the luminescent emergency exit sign to be adhered to a surface;
 activating the luminescent emergency exit sign;
 applying the luminescent emergency exit sign to a surface in the vicinity of the failed electrical emergency exit sign such that the adhesive layer holds it in place as a replacement emergency exit sign;
 completing an intended flight of the aircraft using the luminescent emergency exit sign as a required exit sign; and
 servicing the aircraft to repair or replace the failed electrical emergency exit sign in advance of a next flight of the aircraft.

17. The method of claim 15, wherein the luminescent emergency exit sign is a photoluminescent emergency exit sign, and wherein the activating the photoluminescent emergency exit sign comprises charging the photoluminescent emergency exit sign by exposing the photoluminescent emergency exit sign to light.

18. The method of claim 15, wherein the luminescent emergency exit sign is a chemiluminescent emergency exit sign, and wherein the activating the chemiluminescent emergency exit sign comprises deforming the chemiluminescent emergency exit sign.

19. The method of claim 15, wherein the adhesive layer of the luminescent emergency exit sign is applied to a surface of the failed electrical emergency exit sign, such that the electrical emergency exit sign is completely covered.

20. The method of claim 15, wherein the method further comprises detaching the luminescent emergency exit sign from the failed electrical emergency exit sign prior to servicing.

* * * * *